(12) United States Patent
Halverson et al.

(10) Patent No.: US 7,669,875 B2
(45) Date of Patent: Mar. 2, 2010

(54) REMOTELY RELEASABLE COUPLER AND HOSE RETRIEVAL MECHANISM FOR AIRBRAKE SYSTEM

(75) Inventors: Merlin B. Halverson, Lawrence, KS (US); Harold E. King, Blue Springs, MO (US); Gregory J. Lehman, Lawrence, KS (US)

(73) Assignee: Cargotec Solutions LLC, Ottawa, KS (US)

( * ) Notice: Subject to any disclaimer, the term of this patent is extended or adjusted under 35 U.S.C. 154(b) by 13 days.

(21) Appl. No.: 12/032,418

(22) Filed: Feb. 15, 2008

(65) Prior Publication Data

US 2008/0136138 A1 Jun. 12, 2008

Related U.S. Application Data

(62) Division of application No. 10/788,177, filed on Feb. 26, 2004, now Pat. No. 7,401,801.

(51) Int. Cl.
*B60D 1/62* (2006.01)

(52) U.S. Cl. ............... 280/420; 280/421; 280/422; 285/920; 285/65; 285/62

(58) Field of Classification Search ............ 280/420, 280/421, 422; 285/920, 65, 62
See application file for complete search history.

(56) References Cited

U.S. PATENT DOCUMENTS

| | | | |
|---|---|---|---|
| 2,362,324 A | 11/1944 | Stromberg | |
| 2,463,326 A | 3/1949 | Smisko et al. | |
| 2,772,795 A | 12/1956 | Cramer et al. | |
| 2,816,780 A | 12/1957 | Ross | |
| 2,894,763 A | 7/1959 | Kurth et al. | |
| 2,948,450 A | 8/1960 | Dobrikin | |
| 3,200,975 A | 8/1965 | Chase | |
| 3,208,769 A | 9/1965 | Onori | |
| 3,386,754 A | 6/1968 | Morrison | |
| 3,420,546 A | 1/1969 | Jasovsky | |
| 3,620,551 A | 11/1971 | Brown | |
| 3,628,811 A | 12/1971 | Rivers | |
| 3,779,586 A | 12/1973 | Rossiter | |
| 3,888,513 A * | 6/1975 | Pilz et al. | .......... 280/421 |
| 3,954,194 A | 5/1976 | Stedman | |
| 4,029,217 A | 6/1977 | Morse | |
| 4,269,226 A | 5/1981 | Allread | |

(Continued)

FOREIGN PATENT DOCUMENTS

GB 2204844 A 11/1988

*Primary Examiner*—Lesley Morris
*Assistant Examiner*—Marlon A Arce
(74) *Attorney, Agent, or Firm*—Gardere Wynne Sewell LLP

(57) ABSTRACT

A remotely releasable brake hose coupler for pressure fluid operated brake systems, such as on a motor truck and semi-trailer unit, and a retrieval mechanism for retrieving flexible hoses connected to the coupler. Pressure air from the truck tractor brake system is conducted through a valve to an actuator for effecting movement of a coupler member to release engagement with a corresponding coupler fitting mounted on a trailer. One or more air brake hoses connected to respective remotely releasable couplers are connected to tensioning mechanisms and to a movable boom mounted on the truck tractor for extending the hoses during a remote release operation and then retracting the hoses and couplers to a stored position when the remotely releasable couplers are disconnected from the trailer fittings.

7 Claims, 4 Drawing Sheets

U.S. PATENT DOCUMENTS

| | | |
|---|---|---|
| 4,392,513 A | 7/1983 | Parrish |
| 4,634,151 A | 1/1987 | Holt |
| 5,176,396 A | 1/1993 | Hawthorne et al. |
| 5,388,864 A | 2/1995 | Kozinski |
| 5,399,001 A | 3/1995 | Flournoy |
| 5,472,223 A | 12/1995 | Hawthorne et al. |
| 5,677,667 A | 10/1997 | Lesesky et al. |
| 5,816,621 A | 10/1998 | Frost |
| 5,918,640 A | 7/1999 | Orcutt |
| 6,102,443 A | 8/2000 | Lang, Jr. |
| 6,120,064 A | 9/2000 | McNamara |
| 6,179,319 B1 * | 1/2001 | Malisch et al. ............... 280/477 |
| 6,253,890 B1 | 7/2001 | Hunter |
| 6,902,180 B2 | 6/2005 | Baginski |
| 7,086,659 B2 | 8/2006 | Baginski |
| 2002/0030401 A1 | 3/2002 | Greaves |
| 2003/0029971 A1 | 2/2003 | Hill |
| 2003/0222770 A1 | 12/2003 | Lesesky et al. |
| 2005/0062344 A1 | 3/2005 | Holt et al. |
| 2005/0146208 A1 | 7/2005 | Wattenburg et al. |
| 2005/0161293 A1 | 7/2005 | Drummond |
| 2005/0236807 A1 | 10/2005 | Baginski |

* cited by examiner

REMOTELY RELEASABLE COUPLER AND HOSE RETRIEVAL MECHANISM FOR AIRBRAKE SYSTEM

BACKGROUND OF THE INVENTION

Motor truck tractor and trailer units include releasable airbrake hose couplers for connecting the airbrake system and source of pressure air on board the tractor to the brakes of the trailer. Conventional airbrake couplers or connectors are characterized by opposed connector members which include cooperating tabs and flanges which allow the couplers or connectors to be engaged with each other by placing one coupler adjacent the other and rotating the couplers relative to each other to form the connection. The manual manipulation of these couplers in some way resembles a handshake and such couplers are often referred to as "gladhands".

Conventional airbrake systems for motor trucks also typically include two separate pressure air conduits and respective sets of couplers, one for the main or so-called service brake system and circuit, and the other for the so-called emergency brake circuit. Accordingly, there are two flexible air hoses or conductors associated with a truck tractor which must be connected to separate couplers disposed on the trailer and disconnected from the trailer when the tractor separates from the trailer. This chore is not particularly vexing with conventional over-the-road trucking operations. However, in truck yard or so-called "terminal" operations trailers are constantly being moved about between loading docks and storage positions by a terminal type truck tractor. As many as one hundred and fifty to two hundred trailer moving operations may be carried out in a typical twenty-four hour period, each operation requiring the tractor driver to leave the driver's cab, connect the airbrake hoses to the trailer prior to moving the trailer and then leave the cab again to disconnect the air hoses from the trailer once it is properly parked. Clearly, the hose disconnecting operation is one which increases the cycle time of moving and parking a trailer.

Accordingly, there has been a desire to provide a brake coupler arrangement which would provide for remote release of the couplers or gladhands without requiring the tractor driver to leave the driver's cab. There has further been a need to provide a mechanism for control of and retrieval of the flexible brake lines or hoses connected to the brake couplers so as to prevent the couplers from falling to the ground when they are disconnected from the trailer or otherwise become entangled with the tractor undercarriage. It is to overcome the disadvantages of conventional airbrake hose and coupler arrangements for truck tractor-trailer units and to provide an improved coupler release and hose retrieval mechanism that the present invention has been developed.

SUMMARY OF THE INVENTION

The present invention provides a remotely releasable coupler mechanism for a pressure fluid conductor, particularly an airbrake hose and coupler, such as used on motor truck tractor and trailer units.

The present invention also provides a flexible airbrake hose support and retrieval system for use on a motor truck tractor and, particularly, for use with remotely releasable hose couplers.

In accordance with one aspect of the present invention, a brake hose coupler of the so-called gladhand type is provided which includes a movable flange or retainer for receiving the tab of the opposite coupler part, which flange is movable to a position to allow the opposed couplers to decouple from each other. The coupler flange member is preferably somewhat channel shaped, is adapted to receive the tab or paw of the opposite hose coupler but, when actuated, not only releases from the cooperating hose coupler but forcibly moves one hose coupler with respect to the other. The movable flange is preferably connected to a pressure fluid actuator via a toggle or over center type linkage, is normally in a position for engaging the opposite hose coupler but is responsive to energization of the pressure fluid actuator to move over center in a snap action manner to release and "kick" the tractor mounted coupler away from the opposite or trailer mounted coupler.

In accordance with another aspect of the present invention, a remotely releasable hose coupler for a tractor-trailer brake system is provided which may be actuated remotely from the driver's cab and is operated in conjunction with a movable boom which supports one or more flexible conductors or hoses connected to respective remotely releasable brake hose couplers. A pressure fluid actuator is secured to the movable boom in such a way that when a brake hose coupler is disconnected by remote control, the boom actuator operates to move the boom to a position to move the airbrake hoses to a storage position to prevent hose entanglement or dropping to the ground or uncontrolled swinging of the hoses and couplers during tractor operations.

The present invention further includes a control system for the above mentioned couplers and hose retrieval or control mechanism comprising suitable control elements to avoid sudden and uncontrolled movement of components of the mechanism. Further, the control system provides for operation of the remotely releasable brake hose couplers and the retrieval and support mechanism from a truck tractor cab. Moreover, the retrieval mechanism may utilize pressure fluid from the vehicle brake system and from a remotely controllable trailer unlatching mechanism.

Those skilled in the art will further appreciate the above-mentioned advantages and superior features of the invention, together with other important aspects thereof upon reading the detailed description which follows in conjunction with the drawings.

DETAILED DESCRIPTION OF A PREFERRED EMBODIMENT

Figure 1:
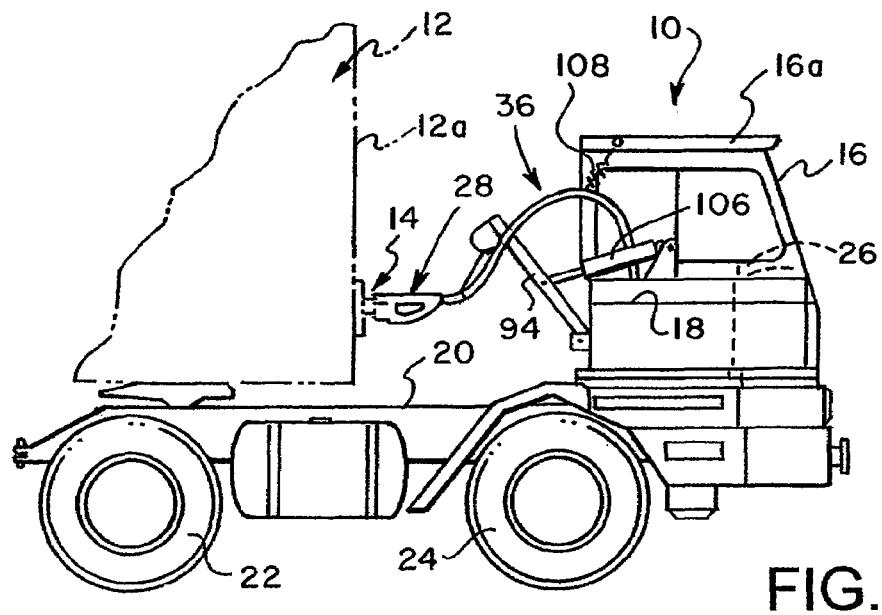
FIG. 1 is a side elevation of a terminal truck tractor including the remotely releasable brake hose couplers and brake hose retrieval mechanism of the present invention.

In the description which follows like parts are marked throughout the specification and drawing with the same reference numerals, respectively. The drawing figures may not necessarily be to scale and certain features may be shown in generalized or somewhat schematic form in the interest of clarity and conciseness.

Referring to FIG. 1, there is illustrated a motor truck tractor 10 of the so-called terminal type adapted for moving semi-trailers, such as a semi-trailer 12 over relatively short distances within a large freight yard or terminal, for example. Terminal tractors, such as the terminal tractor 10, often move as many as two hundred trailers in a twenty-four hour period, thereby going through, for each trailer movement, a cycle of coupling and uncoupling a trailer with respect to the tractor. Conventional semi-trailers, such as the semi-trailer 12, include airbrake hose couplers or fittings mounted, typically, on a forward wall 12a of the trailer and generally in a location as indicated by numeral 14 in FIG. 1. Airbrake hose coupler fittings, such as those mounted at location 14 may also be mounted adjacent a far left or right edge of the aforementioned forward wall of the trailer, such as the wall 12a in FIG. 1.

Truck tractor 10 includes a driver's cab 16 and a hood 18 generally overlying a main propulsion engine and accessories therefore, not shown. The tractor 10 also is characterized by a conventional chassis or frame 20 including spaced apart pneumatic tired wheels 22 and 24. A control panel or dashboard 26 of a generally conventional configuration is disposed within the cab 16. Terminal tractor 10 has been modified to include the present invention comprising the aforementioned remotely releasable brake hose couplers and a retrieval mechanism for fluid or pressure air brake hoses which are connected to the couplers and to the brake system of the tractor 10 and operable to be connected to the couplers or fittings mounted on trailer 12.

Figure 5:
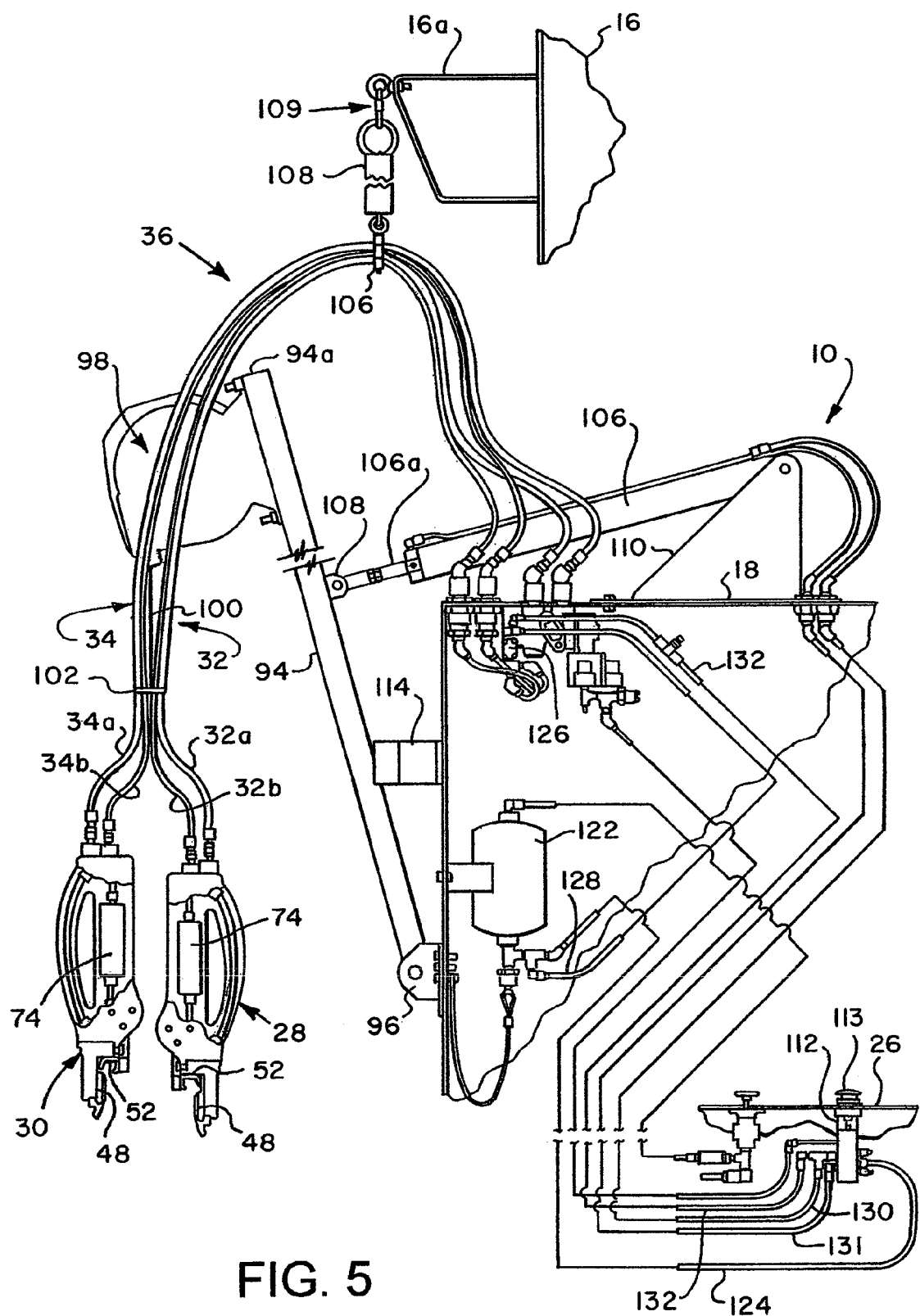
FIG. 5 is a view showing the brake couplers, the brake hose retrieval mechanism and associated control circuitry of the present invention.

In FIG. 1, as well as FIG. 5, two remotely releasable brake hose couplers or so-called gladhands 28 and 30 are shown connected to pressure fluid conductors in the form of flexible hose assemblies 32 and 34 which are supported by a hose retrieval mechanism or system, generally designated by numeral 36 in FIGS. 1 and 5 and, for the most part, mounted on hood 18, as shown more clearly in FIG. 5.

Figure 2:
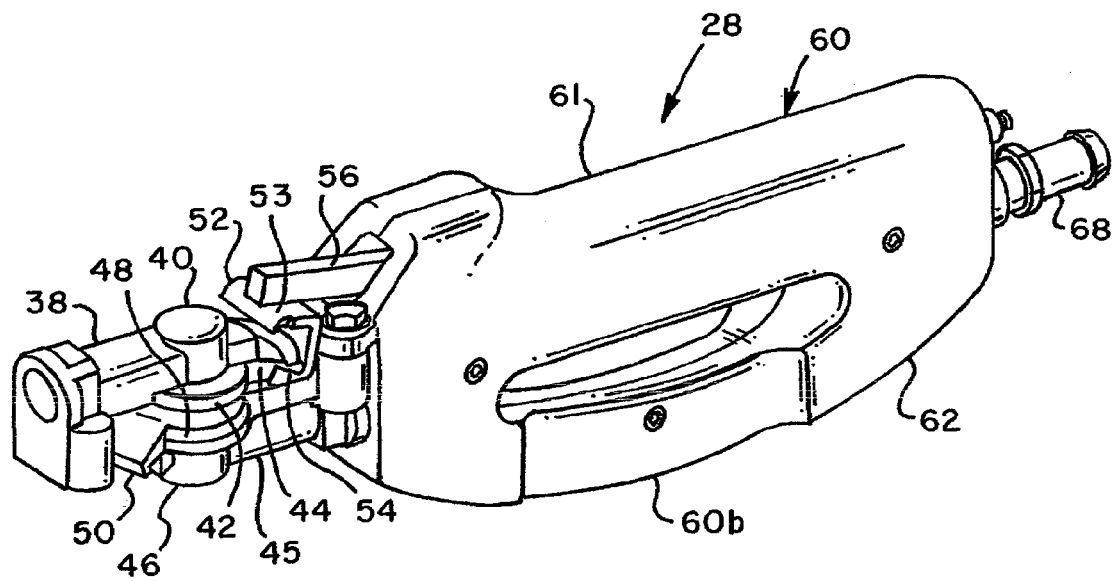
FIG. 2 is a perspective view of a remotely releasable brake hose coupler in accordance with the invention, showing the coupler partially released from a mating coupler.

Referring now to FIG. 2, there is illustrated one of the remotely releasable brake hose couplers in accordance with the invention comprising the coupler 28. Coupler 28 is adapted to be coupled to a fitting 38 which may be disposed on the trailer at location 14 for conducting pressure air to the trailer brake system, not shown. Fitting 38 includes a head part 40 with a generally cylindrical face 42 and a radially projecting somewhat circular segment shaped tab 44.

Hose coupler 28 is also provided with a fitting 45 somewhat like the fitting 38 and including a head 46 with a cylindrical face portion 48 formed thereon which is engageable with face 42 of fitting 38 in fluid sealing relationship and whereby passages within the fittings 38 and 45 are placed in flow communication with each other for conducting pressure air to the trailer brake system, for example. Fitting 45 also includes a radially projecting, circular segment shaped tab 50 which may engage a cooperating flange, not shown, on fitting 38 in a conventional manner known to those of skill in the art of truck tractor brake hose couplers. Conventional brake hose couplers are described in further detail in U.S. Pat. No. 6,120,064 to McNamara, issued Sep. 19, 2000, for example.

Figure 3:
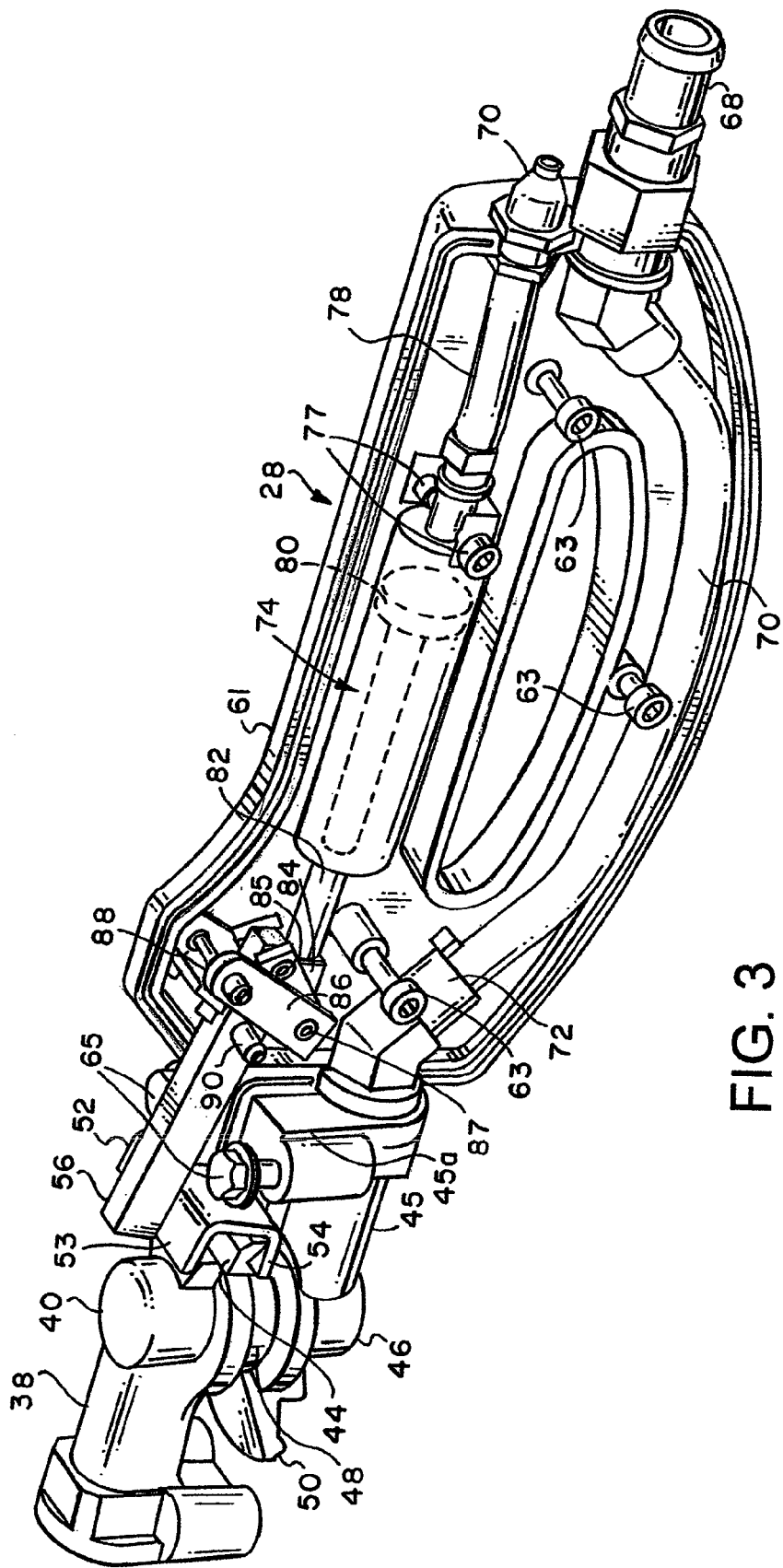
FIG. 3 is a cutaway view of the brake hose coupler shown in FIG. 2 with one half of the coupler housing removed for illustrative purposes.

Referring further to FIG. 2, hose coupler 28 includes a somewhat channel shaped member 52 forming opposed flanges 53 and 54, see FIG. 3 also. Coupler member 52, in its normal working position, is in forcible engagement with tab 44 to secure the fittings 38 and 45 in forcible engagement and to allow for pressure air to flow between the fittings and to the aforementioned trailer brake system. However, coupler member 52 is connected to an elongated movable link 56, see FIGS. 2 and 3, which provides for moving member 52 in a somewhat circular arc upwardly, viewing FIGS. 2 and 3, whereby flange 53 tends to move out of engagement with tab 44 and flange 54 forcibly engages with tab 44 strongly urging the fittings 38 and 45 to separate from each other whereby the coupler 28 may be disconnected from the trailer brake system. As mentioned earlier, tab 50 may engage a cooperating flange on fitting 38 or a similar fitting, not shown. However, movement of the coupler member 52 out of forcible engagement with tab 44 will allow the fittings 38 and 45 to separate freely.

Referring still further to FIGS. 2 and 3, as shown in FIG. 2, the coupler 28 includes a handgrip part 60, preferably formed of opposed housing members 61 and 62 which are essentially mirror image parts. Handgrip part 60 includes a grip portion 60a and a knuckle shield 60b formed by the opposed shell like housing members 61 and 62 which may be secured together by conventional fasteners 63, see FIG. 3. In FIG. 3 member 62 has been removed to illustrate certain parts of coupler 28.

As further shown in FIG. 3, by way of example, housing member 61 for handgrip part 60 is a hollow shelllike member and is suitably connected to the fitting 45 at a boss 45a by conventional fasteners 65. Hand grip housing members 61 and 62 cooperate to support a fitting 68 which is connectable to a pressure air hose 32a, FIG. 5, of the hose assembly 32. A second fitting 70, FIG. 3, is also supported by and between the housing members 61 and 62 and is adapted to be connected to pressure air hose 32b, FIG. 5, of the hose assembly 32. Pressure air is conducted through the coupler 28 by a conduit 70, FIG. 3, suitably connected to fitting 68 and to a fitting 72, which in turn, is operably connected to coupler fitting 45.

Figure 4:
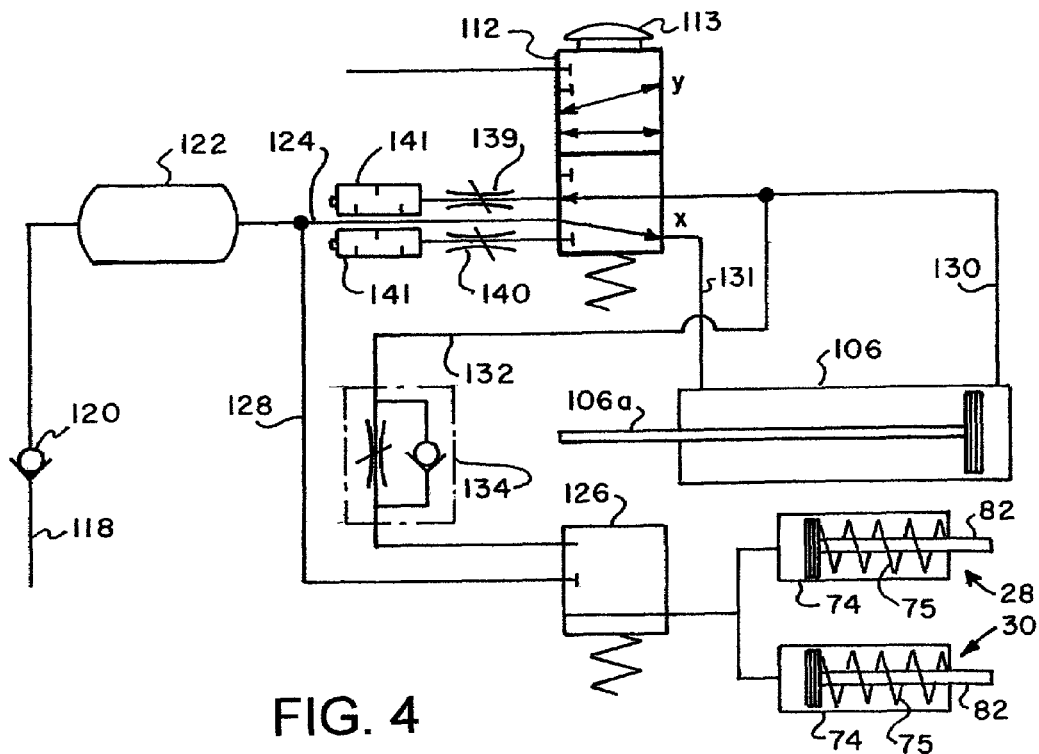
FIG. 4 is a schematic diagram of the control circuitry for the coupler and hose retrieval mechanism of the present invention.
Figure 6:
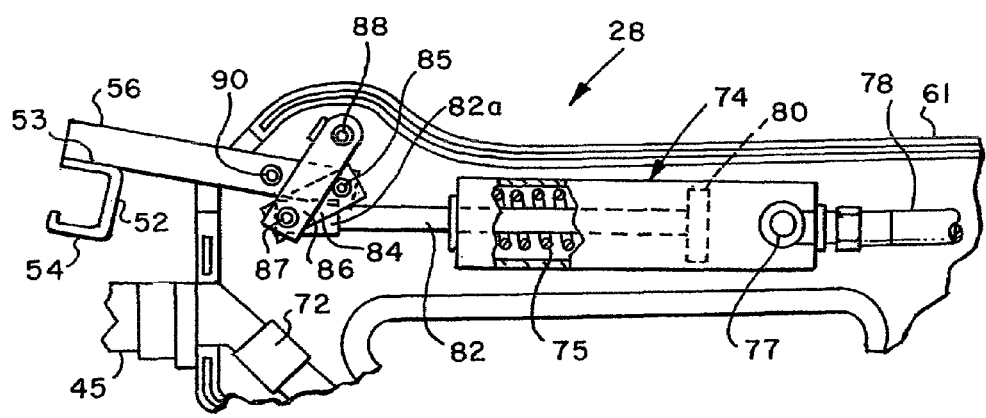
FIG. 6 is a further detail view of the coupler actuating linkage.

The hollow shelllike housing members 61 and 62 also suitably support a pressure fluid actuator in the form of a reciprocating piston and cylinder 74, FIGS. 3, 4 and 6, which is mounted for limited pivotal movement on trunnions 77, FIG. 3, within the housing members 61 and 62. Cylinder actuator 74 is suitably connected to the fitting 70 by a flexible conduit 78, FIGS. 3 and 6.

Referring further to FIGS. 3 and 6, a spring biased piston 80 is disposed in actuator cylinder 74, is engaged by a coil compression spring 75 and includes a piston rod 82 extending therefrom and connected to an over center linkage including spaced apart first links 84. Links 84 are pivotally connected at one end to member 56 by way of a pivot pin 85, see FIG. 6 also. The pivot connection between links 56 and 84 is disposed at an end of link 56 opposite the end which is connected to the coupler member 52. The opposite ends of links 84 are connected to spaced apart second links 86 at a pivot pin 87. Pin 87 is supported on distal end 82a of piston rod 82. Links 86 are, at their ends opposite the ends which include pivot pin 87, pivotally supported within and by the handgrip part 60 by a pivot pin 88, FIG. 3. Pivot pin 88 is supported in suitable bores, not shown, in the opposed shelllike housing members 61 and 62. In like manner link 56 is supported for pivotal movement about a pivot pin 90 by handgrip part 60 in essentially the same manner.

Accordingly, the links 84, 86 and 56, together with the distal end 82a of piston rod 82 are operable, in response to extension of the piston rod 82 to the left, viewing FIGS. 3 and 6, to effect rotation of link 56 generally upwardly through the position shown sufficiently to disengage the coupler 28 from the fitting 38. However, in response to the piston 80 and piston rod 82 moving to the right, viewing FIG. 3, the linkage formed by the links 84, 86 and 56 will assume an over center position, having moved generally in a counterclockwise direction, viewing FIGS. 3 and 6, and thus positioning the coupler member 52 such that flange 53 is forcibly engaged with tab 44 to maintain the fittings 38 and 45 in forcible engagement. Cylinder actuator 74 includes the suitable coil spring 75 engageable with piston 80 and disposed in sleeved relationship over piston rod 82 to urge the piston toward the position wherein the aforementioned linkage will move to an over center position to cause the coupler member 52 to forcibly engage the fitting 38 and hold the coupler 28 engaged with the fitting 38 in fluid flow conducting relationship.

Accordingly, without pressure air supplied to actuator 74 the coil spring 75 provides a sufficient force to urge the linkage interconnecting piston rod 82 with link 56 to a position such that the coupler member 52 may be forcibly engaged with the tab 44 when the coupler 28 is engaged with the fitting 38. However, the actuator 74 may be controlled to move the piston 80 and piston rod 82 to a position such that the coupler 28 may be disengaged from the fitting 38 by remote control through the supply of pressure air through conduit or hose 32b, fitting 70, and conduit 78 to the cylinder actuator 74. Upon release of pressure air from the cylinder actuator 74 the spring 75 is of sufficient strength to move the coupler member 52 back to its working position for forcible engagement with a fitting 38 or the like. This action owes thanks, in part, also to the pivotable trunnion mounting arrangement of actuator 74.

Referring now to FIG. 5, the remotely releasable coupler 30 is essentially identical to the coupler 28 and thus requires no further explanation. In FIG. 5, the coupler members 52 are shown in their normal working positions operable to receive tabs 44 of fittings 38, for example, although not shown in FIG. 5. Hose assembly 34 includes brake hose 34a and coupler release actuator hose 34b connected to the coupler 30 in the same manner as the hoses 32a and 32b are connected to coupler 28.

Referring further to FIG. 5, the couplers 28 and 30, together with their hose assemblies 32 and 34, are supported by retrieval mechanism 36 which includes an elongated boom 94 pivotally mounted on hood 18 at a suitable clevis 96. The distal end 94a of boom 94 supports a spring biased cable reel assembly 98 including a retractable cable 100 suitably secured to the hose assemblies 32 and 34 at 102. The reel assembly 98 includes a spring biased cable reel, not shown, of conventional construction for counterbalancing and biasing the hose assemblies 32 and 34, generally into the position shown. Additional support for the hose assemblies 32 and 34 includes a support ring 106 connected to a coil extension spring 108 which, in turn, is connected to a bracket 109 supported on a coaming 16a forming part of the cab 16, see FIG. 1 also. The spring biased reel assembly 98 and the spring 108 allow the hose assemblies 32 and 34 to be moved about when connected to a trailer and, as the tractor 10 moves relative to the trailer, but the reel assembly 98 and the spring 108 will also restrain the hoses and partially retrieve the hoses regardless of the position of the boom 94.

Referring further to FIG. 5, the boom 94 is moved between a substantially retracted position shown in FIG. 5 to an extended position by a pressure fluid actuator 106 comprising a somewhat conventional double acting piston and cylinder. Actuator 106 is pivotally connected to the boom 94 at a clevis type connector 108 and actuator 106 is connected at its opposite end to a suitable clevis bracket 110 mounted on hood 18. Pressure air is supplied to the actuator 106 by way of a control device comprising a driver controlled valve 112 having a palm or button type actuator 113 and preferably mounted on control panel or dashboard 26. Boom 94 is adapted to be partially supported in its retracted position by a somewhat channel shaped guide bracket 114, FIG. 5, also mounted on hood 18, as indicated.

Referring further to FIGS. 4 and 5, a control system for the remotely releasable couplers 28 and 30 and the hose retrieval mechanism 36 is illustrated schematically in FIG. 4. Pressure air from an onboard pneumatic or pressure air system of the tractor 10 is supplied to the control system shown in FIG. 4 from two sources. A pressure air conduit 118 from a trailer or so called fifth wheel unlatch mechanism, not shown, extends via a check valve 120 to a reservoir 122 which may be mounted within the enclosure defined by hood 18, as shown in FIG. 5. Reservoir 122 is connected to control valve 112 via a conduit 124 and to a pilot pressure fluid actuated control valve 126 by way of a conduit 128, FIGS. 4 and 5. Upon actuation of the valve 126, pressure air is supplied to the actuators 74 of the respective remotely releasable couplers 28 and 30. When pilot pressure air is vented from valve 126, valve 126 moves to a position to vent pressure air from the actuators 74, as indicated in the schematic diagram of FIG. 4.

Control valve 112 is operably connected to double acting pressure fluid cylinder actuator 106, as indicted in FIGS. 4 and 5, for supplying pressure air to respective opposite ends of the actuator to move the boom 94. As shown in FIG. 4, valve 112 is normally in a position "x" to allow pressure air from reservoir 122 to bias the actuator 106 to a retracted position placing the boom 94 retracted and engaged with the support bracket 114. However, during operation of the tractor 10 to park a trailer and release or decouple from the trailer, valve 112 is actuated to position "y" by the tractor driver or other operating personnel on the tractor 10 to conduct pressure air by way of conduit 130 to extend the piston rod 106a of actuator 106. Simultaneously, pressure air is conducted via conduit 132 through an adjustable speed control or throttling valve 134 to pilot pressure fluid controlled valve 126, shifting valve 126 so that pressure air is supplied via conduit 128 to the actuators 74 causing the couplers 28 and 30 to release their connections to respective trailer fittings 38, but, normally, only after boom 94 has been extended, that is, pivoted in a counterclockwise direction, viewing FIG. 5, at a smoothly controlled rate, thanks to an adjustable speed control or throttling valve 140 which throttles air flow out of the opposite end of the cylinder of cylinder type actuator 106. As boom 94 is extended, tension on the hose assemblies 32 and 34 is maintained by the reel 98 and the spring 108.

When the tractor driver observes that the couplers 28 and 30 have disconnected, actuator 113 for valve 112 is released and valve 112 returns to position "x" shown in FIG. 4, with pressure air supplied via conduit 131 to the opposite end of actuator 106 causing it to move boom 94 back to a fully retracted position while the reel 98 and the spring 108 continue to maintain tension on the hose assemblies 32 and 34. The couplers 28 and 30 and the hose assemblies 32 and 34 are retrieved substantially to the position shown in FIG. 5 out of harm's way. Moreover, cylinder actuator 106 is controlled to move at a desired rate in both directions of operation by suitable speed control or throttling valves 139 and 140, FIG. 4, connected to valve 112 and to suitable exhaust mufflers 141, respectively, as shown. Moreover, adjustable speed control valve 134 allows actuator 106 to move boom 94 to a somewhat extended position before the actuators 74 are energized sufficiently to release the couplers 28 and 30.

Accordingly, the cycle time for moving a semi-trailer with the tractor 10 is substantially reduced and the hazards associated with manually releasing the brake pressure air hoses and couplers from a trailer are reduced by the remotely controllable couplers 28 and 30 and the associated retrieval mechanism 36 described and shown. The components of the remotely controllable couplers 28 and 30 and retrieval mechanism 36, as well as the control system associated therewith, may be fabricated using conventional engineering materials and control components including valving, hoses and related fittings.

Although a preferred embodiment of the invention together with a description of its operation has been set forth hereinabove, those skilled in the art will appreciate that various substitutions and modifications may be made without departing from the scope and spirit of the appended claims.

What is claimed is:

1. In a motor truck tractor for transporting a trailer having a pressure fluid operated brake system, a flexible pressure fluid conduit connected to a source of pressure fluid for conducting same between said tractor and a trailer;
   a remotely releasable coupler for coupling said conduit to a fitting connected to said trailer, said coupler including a member engageable with a part of said fitting for retaining said coupler connected to said fitting, and
   an actuator on said coupler connected to said member and operable to move said member to a position to allow said coupler to decouple from said fitting, said actuator comprising a pressure fluid cylinder actuator responsive to pressure fluid supplied thereto to effect movement of said member to a position to release said coupler from said fitting;
   a linkage interconnecting said actuator with said member for holding said member in a position in forcible engagement with said fitting and responsive to actuation of said actuator to move said member to effect release of said member from said fitting,
   wherein said actuator is mounted for limited pivotal movement on said coupler to accommodate movement of said linkage.

2. The invention set forth in claim 1 including:
   a pressure fluid control circuit operably connected to said actuator including a tractor driver operable control valve for valving pressure fluid to effect actuation of said actuator to effect release of said coupler.

3. The invention set forth in claim 2 wherein:
   said driver operable control valve is disposed in a cab of said tractor.

4. In a motor truck tractor for transporting a trailer having a pressure fluid operated brake system:
   a flexible pressure fluid conduit connected to a source of pressure fluid for conducting same between said tractor and a trailer; and
   a remotely releasable coupler for coupling said conduit to a fitting connected to said trailer, said coupler including:
   a member engageable with a part of said fitting for retaining said coupler connected to said fitting;
   a handgrip including a conduit disposed therein for conducting pressure air between said coupler and said fitting;
   a pressure fluid actuator disposed in said handgrip and connected to said member and operable to move said member to a position to allow said coupler to decouple from said fitting; and
   a linkage interconnecting said actuator with said member for holding said member in a position in forcible engagement with said fitting and responsive to operation of said actuator to move said member to effect release of said member from said fitting.

5. The invention set forth in claim 4 including:
   a pressure fluid control circuit operably connected to said actuator including a tractor driver operable control valve for valving pressure fluid to effect operation of said actuator to effect release of said coupler.

6. The invention set forth in claim 4 wherein:
   said actuator is mounted for limited pivotal movement on said coupler to accommodate movement of said linkage.

7. In a motor truck tractor for transporting a trailer having a pressure fluid operated brake system:
   a flexible pressure fluid conduit connected to a source of pressure fluid for conducting same between said tractor and a trailer; and
   a remotely releasable coupler for coupling said conduit to a fitting connected to said trailer, said coupler including:
   a member engageable with a part of said fitting for retaining said coupler connected to said fitting;
   an actuator on said coupler connected to said member and operable to move said member to a position to allow said coupler to decouple from said fitting; and
   a handgrip in which said actuator is disposed and formed by opposed housing members and including a conduit therein for conducting pressure air between said coupler and said fitting.

* * * * *